US010341737B2

(12) United States Patent
Anguiano

(10) Patent No.: US 10,341,737 B2
(45) Date of Patent: Jul. 2, 2019

(54) INTEGRATING BROADCAST MEDIA STREAMS WITH USER MEDIA STREAMS

(71) Applicant: EchoStar Technologies L.L.C., Englewood, CO (US)

(72) Inventor: Jason Anguiano, Castle Rock, CO (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 0 days.

(21) Appl. No.: 15/274,967

(22) Filed: Sep. 23, 2016

(65) Prior Publication Data

US 2018/0091863 A1    Mar. 29, 2018

(51) Int. Cl.
H04N 21/234 (2011.01)
H04N 21/482 (2011.01)
H04N 21/44 (2011.01)
H04N 21/262 (2011.01)
H04N 21/431 (2011.01)
H04N 21/475 (2011.01)
H04N 1/00 (2006.01)

(52) U.S. Cl.
CPC ....... *H04N 21/482* (2013.01); *H04N 1/00472* (2013.01); *H04N 21/234* (2013.01); *H04N 21/23424* (2013.01); *H04N 21/26258* (2013.01); *H04N 21/431* (2013.01); *H04N 21/4312* (2013.01); *H04N 21/4316* (2013.01); *H04N 21/44* (2013.01); *H04N 21/4758* (2013.01); *H04N 21/4826* (2013.01)

(58) Field of Classification Search
CPC .......... H04N 21/234; H04N 21/23424; H04N 21/431; H04N 21/4312; H04N 21/4316; H04N 21/4826; H04N 1/00472
See application file for complete search history.

(56) References Cited

U.S. PATENT DOCUMENTS

| 9,510,051 | B1* | 11/2016 | Bostick | H04N 21/4668 |
| 2008/0320522 | A1* | 12/2008 | Jones | H04H 20/38 725/46 |
| 2009/0169178 | A1* | 7/2009 | Higgins | G06Q 30/02 386/239 |
| 2009/0187936 | A1* | 7/2009 | Parekh | H04H 20/38 725/25 |
| 2012/0137317 | A1* | 5/2012 | Elizarov | H04N 21/252 725/13 |
| 2012/0246677 | A1* | 9/2012 | Fasting | H04N 7/14 725/34 |
| 2012/0284755 | A1* | 11/2012 | Keret | H04N 21/2187 725/62 |
| 2012/0331169 | A1* | 12/2012 | McIntire | H04N 21/23614 709/231 |

(Continued)

*Primary Examiner* — Robert J Hance
(74) *Attorney, Agent, or Firm* — Perkins Coie LLP

(57) ABSTRACT

Various embodiments of systems, apparatus, and/or methods are described for integrating a broadcast media stream with media streams from one or more amateur sources. In one implementation, a method includes receiving, at a stream integrator, one or more user media streams captured by one or more user capture devices, receiving a broadcast stream from a broadcast provider, selecting at least one of the one or more user media streams based on one or more parameters, and integrating one or more of the selected user media streams into the broadcast stream.

18 Claims, 6 Drawing Sheets

(56) References Cited

U.S. PATENT DOCUMENTS

2016/0381110 A1* 12/2016 Barnett ................ H04L 65/601
709/231
2017/0019715 A1* 1/2017 Hundemer ............ H04L 67/18

* cited by examiner

US 10,341,737 B2

INTEGRATING BROADCAST MEDIA STREAMS WITH USER MEDIA STREAMS

BACKGROUND

A broadcast provider typically transmits media streams that are created by professional video makers. These professional video makers typically utilize professional-grade equipment to create the broadcast media stream. However, the amount of professional-grade equipment, and video makers trained to use the equipment, may be limited. Thus, the broadcast provider may not be capable of covering certain aspects of an event. For example, during a news event, the broadcast provider may not have any professional-grade equipment and/or professional video makers available to capture the event.

BRIEF DESCRIPTION OF THE DRAWINGS

The same number represents the same element or same type of element in all drawings.

DETAILED DESCRIPTION

The various embodiments described herein generally provide apparatus, systems and methods which facilitate the reception, processing, rendering, and outputting of a media stream. More particularly, the various embodiments described herein provide for the integration of media streams from a professional source with media streams from amateur sources. The professional source may be a broadcast provider, and the amateur sources may be users capable of capturing a media stream with their own personal capture devices, e.g., mobile devices. In some embodiments, the media stream can include live broadcasting of one or more events.

In at least one embodiment, the media stream to be received, processed, rendered, and displayed may come in any form of media stream. Exemplary media stream formats include Motion Picture Experts Group (MPEG) standards, Flash, Windows Media and the like. It is to be appreciated that the media stream may be supplied by any source, such as an over-the-air broadcast, a satellite, or cable television distribution system, a digital video disk (DVD) or other optical disk, the Internet or other communication networks, and the like. In at least one embodiment, the media stream may be associated with supplemental data that includes text data, such as closed captioning data or subtitles. Particular portions of the closed captioning data may be associated with specified portions of the media stream.

Generally, a media stream is a contiguous block of associated audio and video data that may be transmitted to, and received by, an electronic receiving device, such as a terrestrial ("over-the-air") television receiver, a cable television receiver, a satellite television receiver, an Internet connected television or television receiver, a computer, a portable electronic device, or the like. In at least one embodiment, a media stream includes an event. The event may be a contiguous block of programming from a television channel (e.g., an episode of a television show or a football game) or other identifiable media content.

Further, a media stream may be delivered by any transmission method, such as broadcast, multicast, simulcast, closed circuit, pay-per-view, on-demand, over-the-top (by "streaming," file transfer, or other means), or other methods. Additionally, the media stream may be transmitted by way of any communication technology, such as by satellite, wire or optical cable, wireless, or other means. The media stream may also be transferred over any type of communication network, such as the Internet or other wide area network, a local area network, a private network, a mobile communication system, a terrestrial television network, a cable television network, and a satellite television network.

Figure 1:
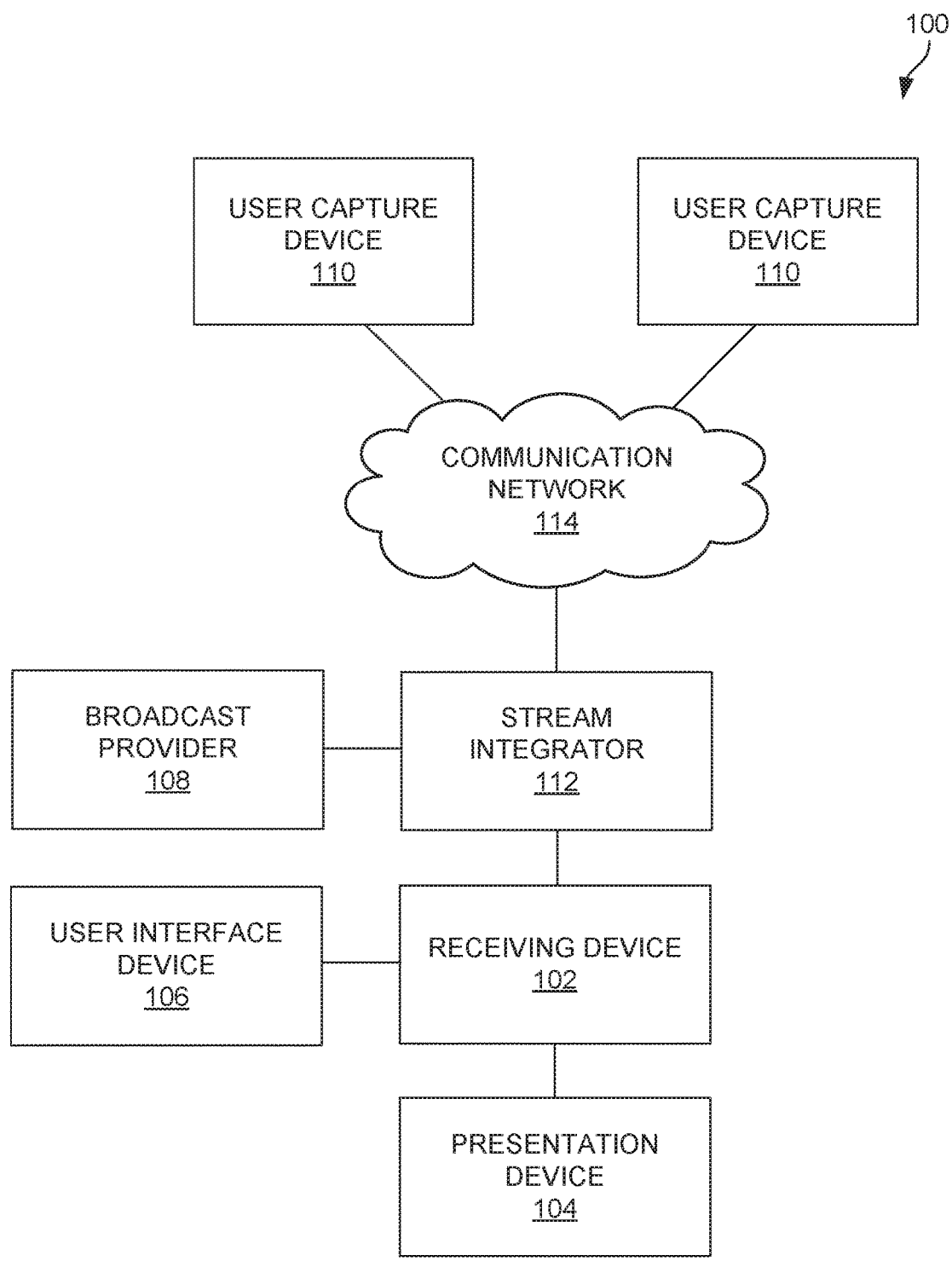
FIG. 1 illustrates an embodiment of a system for integrating user content into a broadcast stream, in accordance with various aspects of the present disclosure.

FIG. 1 illustrates an embodiment of a system 100 for integrating user content into a broadcast stream, in accordance with various aspects of the present disclosure. The system 100 includes a receiving device 102, a presentation device 104 (e.g., a display and speakers), a stream integrator 112, and one or more user capture devices 110. The stream integrator 112 is operable to receive media streams from the user capture devices 110 through a communication network 114. The stream integrator 112 also receives a broadcast stream from a broadcast provider 108. The stream integrator 112 selects one or more media streams from the user capture devices 110 that are relevant to the content in the broadcast stream, and then integrates those media streams into the broadcast stream. The stream integrator 112 then transmits the integrated stream to the receiving device 102 for presentation to a user. The integrated stream is presented to the user by the presentation device 104.

The user capture devices 110 may be any device capable of capturing audio/video content and transmitting the content over the communication network 114. Examples of user capture devices 110 include mobile phones, video cameras (e.g., cameras from GoPro® of San Mateo, Calif.), laptop computers, and/or tablets. The communication network 114 may be any network capable of distributing the media streams from the user capture devices 110. Exemplary communication networks include the Internet, cellular networks, WiFi networks, local area networks (LAN), and the like. The communication network 114 may utilize any desired combination of wired (e.g., cable and fiber) and/or wireless (e.g., cellular, satellite, microwave, and radio frequency) communication mediums and any desired network topology (or topologies when multiple mediums are utilized).

The broadcast provider 108 provides broadcast streams to the stream integrator 112. In some embodiments, the stream integrator 112 may be a component of the broadcast provider 108 and may receive the broadcast stream directly from the broadcast provider 108. In other embodiments, the broadcast provider 108 may provide the broadcast stream to the stream integrator over a video distribution network, such as an over-the-air distribution network, a satellite distribution network, a cable distribution network, and/or the internet.

Examples of a broadcast provider 108 may include an over-the-air broadcast station, a television network, a cable television provider, a satellite television provider, an on-demand media streaming service, a pay-per-view media streaming service, and/or an over-the-top media streaming service (e.g., internet video streaming).

The receiving device 102 may access the integrated stream from the stream integrator 112 in various ways. For example, the stream integrator 112 may provide the integrated stream over a video distribution network, such as an over-the-air distribution network, a satellite distribution network, a cable distribution network, and/or the internet. The receiving device 102 may then access the integrated stream by demodulating and decrypting the integrated stream provided over the video distribution network. Alternatively, the stream integrator 112 may be local to the receiving device 102 or integrated into the receiving device 102. The receiving device 102 may then access the integrated stream through a local communication bus, such as parallel ATA (PATA, also called IDE or EIDE), Serial ATA (SATA), SCSI, Serial Attached SCSI (SAS), Fibre Channel, IEEE 1394 (also called FireWire), USB, SCSI, or Thunderbolt, or through a local communication network, such as a local area network (LAN), wireless local area network (WLAN), Bluetooth, or the like.

The receiving device 102 may be any device capable of receiving a media stream and rendering the media stream. For example, the receiving device 102 may be a set-top box (STB) configured to communicate with a cable or satellite distribution network. In another example, the receiving device 102 may be computer, a mobile phone, a tablet, or similar device configured to communicate with the internet or comparable data communication network. The media stream received by the receiving device 102 includes at least audio data and video data. In one embodiment, the video data includes a series of digital frames, or single images to be presented in a serial fashion to a user. Similarly, the audio data may be composed of a series of audio samples to be presented simultaneously with the video data to the user. In one example, the audio data and the video data may be formatted according to one of the MPEG encoding standards, such as MPEG-2 or MPEG-4, as may be used in DBS systems, terrestrial Advanced Television Systems Committee (ATSC) systems or cable systems. However, different audio and video data formats may be utilized in other implementations. The receiving device 102 renders the received media stream and provides the audio/video rendering to the presentation device 104 for display to a user.

The presentation device 104 may be any device configured to receive an audio/video rendering from the receiving device 102 and present the audio/video rendering to a user. Examples of the presentation device 104 include a television, a video monitor, a smartphone, a desktop, a laptop, a tablet PC, or similar device capable of presenting audio and video information to a user. The receiving device 102 may be communicatively coupled to the presentation device 104 through any type of wired or wireless connection. Exemplary wired connections include coax, fiber, composite video and high-definition multimedia interface (HDMI). Exemplary wireless connections include WiFi, ultra-wide band (UWB) and Bluetooth. In some implementations, the presentation device 104 may be integrated with the receiving device 102. For example, each of a computer, a mobile phone, a tablet, or other communication devices may serve as both the receiving device 102 and the presentation device 104 by providing the capability of receiving media streams, and presenting the received media streams to a user. In another implementation, a cable-ready television may include a converter device for receiving media streams, and displaying the media streams to a user.

The integrated stream from the stream integrator 112 may allow a user to select between different media streams broadcasted from the user capture devices 110 and the broadcast stream from the broadcast provider 108. For example, presentation device 104 may present the user with a list of available streams included in the integrated stream, then the user may select one or more of the available streams with a user interface device 106. The selected stream is then provided to the presentation device 104 and displayed to the user. In some embodiments, the media streams from the user capture devices 110 and the broadcast provider 108 may be regarding the same event or related events. For example, if the broadcast stream from the broadcast provider 108 is regarding a live broadcast of an hurricane in a particular city, the media streams from the user capture devices 110 can also be a live broadcast of the hurricane event. In some embodiments, the stream integrator may overlay one or more of the media streams from the user capture devices 110 as windows on top of the broadcast stream from the broadcast provider 108, similar to a picture-in-picture display. The user may then swap which stream is being overlaid by selecting one of the windows with the user interface device 106. The user interface device 106 may be a remote control, a touch screen, a mouse, a keyboard, a motion input device, a pointer, or other device capable of providing commands to the receiving device 102. Alternatively or in addition, the user interface device 106 may provide commands to the presentation device 104, which then relays the commands to the receiving device 102.

In some embodiments of the system 100, the receiving device 102 may communicate user preferences to the stream integrator 112. The user preferences may indicate which media streams from the user capture devices 110 should be integrated into the broadcast stream. The receiving device 102 may generate the user preferences based on input from the user interface device 106. The user preferences may indicate that the user prefers to view media streams from particular user capture devices, from particular locations, having particular types of content, or meeting a minimum voting score. The stream integrator 112 may then integrate one or more of the media streams from user capture devices 110 that fulfill the user's preferences.

In some embodiments, the user's selection of a particular stream from a user capture device 110 may be tallied by the stream integrator 112 as a vote for that particular stream. The stream integrator 112 may record the votes from multiple users viewing the media streams to determine which user capture devices are transmitting the most popular streams. Based on a user's preferences, the stream integrator 112 may integrate the streams from the user capture devices 110 having the most votes from other users.

In other embodiments, the stream integrator 112 may determine which streams from the user capture devices 110 to integrate based on the content, location, or quality of the streams. For example, if the broadcast stream from the broadcast provider 108 associated with a particular location, such as a news event or a sporting event, the stream integrator 112 may automatically integrate media streams from user capture devices 110 at near that location. As another example, if the broadcast stream from the broadcast provider 108 includes particular content, such as a particular actor, a particular movie, or a particular director, the stream integrator 112 may integrate streams from the user capture devices that include similar content. The stream integrator 112 may determine the location or content of the broadcast and user media streams based on content tags or location information included with the streams.

Figure 2:
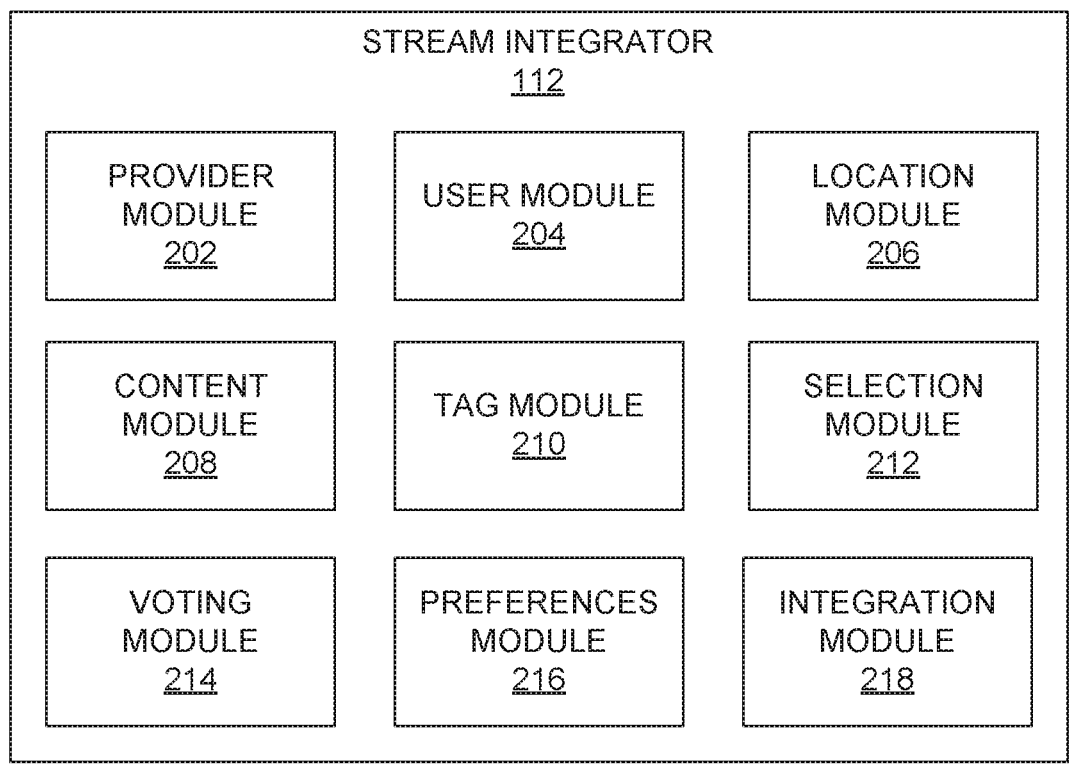
FIG. 2 illustrates an example of a stream integrator, in accordance with various aspects of the present disclosure.

FIG. 2 illustrates an example of a stream integrator 112, in accordance with various aspects of the present disclosure. The stream integrator 112 includes a provider module 202, a user module 204, a location module 206, a content module 208, a tag module 210, a selection module 212, a voting module 214, a preferences module 216, and an integration module 218. The stream integrator 112 may also include other modules, or omit one or more of the illustrated modules. In addition, one or more of the illustrated modules may be combined into a single module, or split into multiple modules. The modules may be implemented by one or more processors and memory included within the stream integrator 112.

The provider module 202 receives a broadcast stream from a broadcast provider 108, as described in reference to FIG. 1. The user module 204 receives one or more media streams from user capture devices 110, as described in reference to FIG. 1.

In some embodiments, the broadcast stream and media streams may include location information. In those embodiments, the location module 206 identifies the location of the broadcast stream based on the location information, and then identifies media streams from the user capture devices 110 having a similar location.

In some embodiments, the broadcast stream and media streams may include content information. In those embodiments, the content module 208 identifies the content of the broadcast stream based on the content information, and then identifies media streams from the user capture devices 110 having similar content.

In some embodiments, the media streams from the user capture devices 110 may be tagged with certain keywords. The keywords may correspond to a location, to the content of the media stream, or to the user capturing the media stream. In those embodiments, the tag module 210 analyzes the keywords to determine if the media stream is relevant to the broadcast stream being provided by the broadcast provider.

The selection module 212 receives an indication from a user of which media stream from the user capture devices 110 the user would like to view. The user may initially be presented with a list of available media streams, or multiple windows containing media streams. The user may then select from the list, or from the multiple windows, to indicate which media stream they prefer to view.

The voting module 214 records the media stream selections from multiple users. Based on the number of times a media stream is selected by user, the voting module assigns the media a number of votes. The stream integrator 112 may then integrate the media streams having the highest number of votes.

The preferences module 216 receives user preferences from a user. The user preferences may indicate that the user prefers to view media streams from particular user capture devices, from particular locations, having particular types of content, or meeting a minimum voting score. The stream integrator 112 may then integrate one or more of the media streams from user capture devices 110 that fulfill the user's preferences.

The integration module 218 integrates one or more of the media streams from the user capture devices into the broadcast media stream. The integration module 218 may determine which media stream to integrate based on the location information from the location module 206, the content information from the content module 208, the keyword information from the tag module 210, a user selection from the selection module 212, a voting score from the voting module 214, and/or user preferences from the preferences module 216.

The media streams may be integrated into the broadcast stream in various ways. The integration module 218 may modify the broadcast stream to include a list of the available media streams. Then after receiving a selection from the list, the integration module 218 may replace the broadcast stream with the selected media stream. Alternatively or in addition, the integration module 218 may modify the broadcast stream to present one or more of the media streams simultaneously. For example, one or more of the media streams may overlay the broadcast stream in smaller pop-up windows. The user may then select one of the pop-up windows to replace the broadcast stream. The broadcast stream may then be displayed as a smaller pop-up window.

Figure 3:
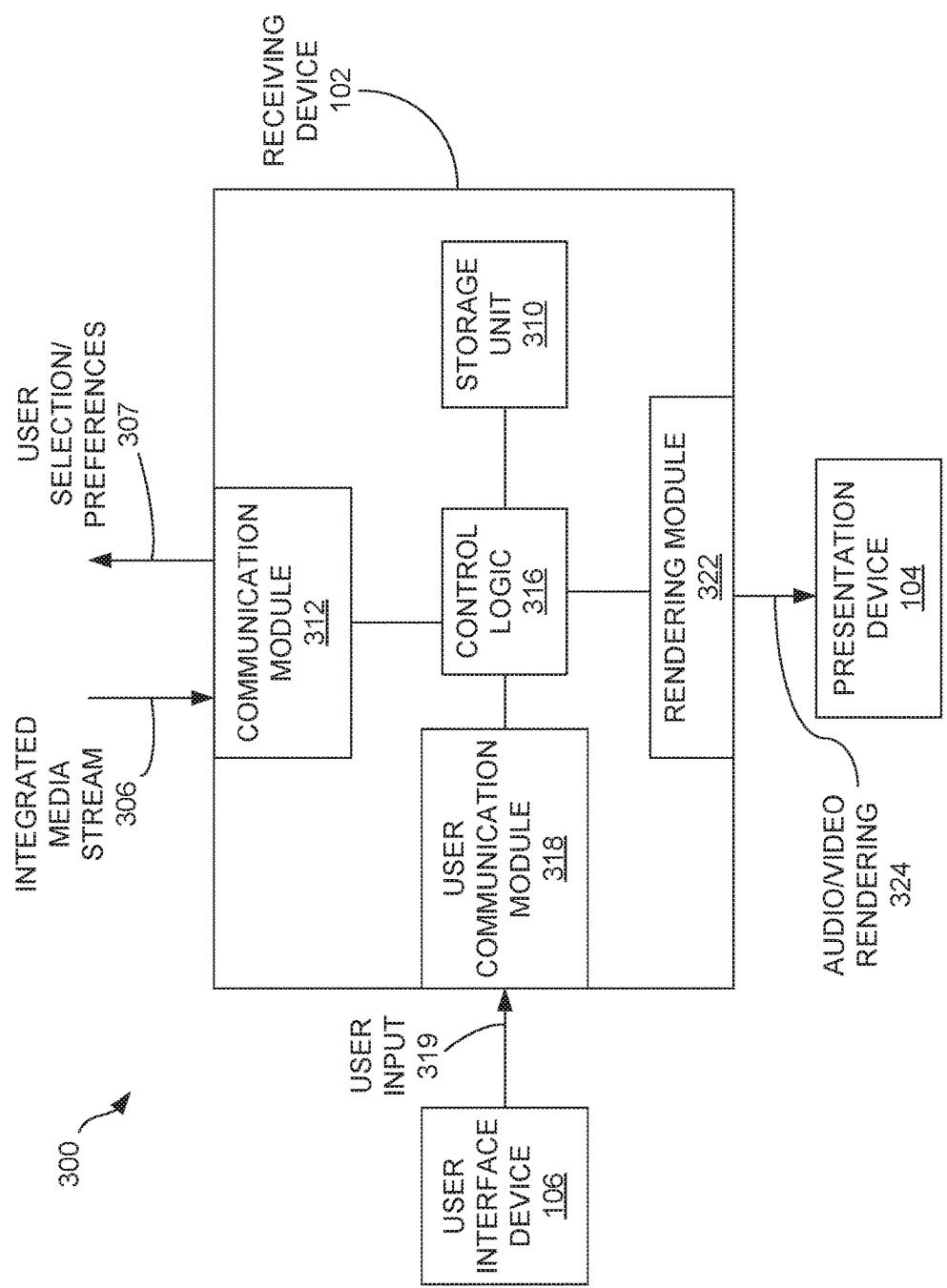
FIG. 3 illustrates an embodiment of a receiving device in a system for presenting an integrated media stream to a user, in accordance with various aspects of the present disclosure.

FIG. 3 illustrates an embodiment of a receiving device 102 in a system 300 for presenting an integrated media stream to a user, in accordance with various aspects of the present disclosure. The receiving device 102 includes a communication module 312 for receiving an integrated media stream 306 from a stream integrator 112. The communication module 312 also transmits a user selection and/or user preferences 307 to the stream integrator 112. One or more storage units 310 may be included internal and/or external to the receiving device 102. The storage unit 310 may store media streams, user preferences, or other information for the receiving device 102.

The receiving device 102 also includes a user communication module 318, control logic 316, and a rendering module 322. The user communication module 318 receives user input 319 from a user interface device 106. The user communication module 318 may also transmit signals to the user interface device 106. The control logic 316 is operable to control the reception of the integrated media stream 306 and the transmission of user selection and/or user preferences 307 by the communication module 312. The control logic 316 may also coordinate the storage of an integrated media stream 306 and/or user preferences to the storage unit 310. The control logic 316 also coordinates the output of an integrated media stream 306 to the rendering module 322. The rendering module 322 renders the integrated media stream 306 and outputs an audio/video rendering 324 to the presentation device 104. Furthermore, the receiving device 102 and system 300 may include other components, modules, elements, or devices not illustrated for the sake of brevity.

The communication module 312 may receive an integrated media stream 306 from any type of distribution network. For example, the communication module 312 may be capable of receiving a high definition media stream, a standard definition media stream, a 3-D media stream, an internet video stream, or other types of media streams.

In some embodiments, the stream integrator 112 described in reference to FIGS. 1 and 2 may be integrated into the receiving device 102. In those embodiments, the control logic 316 may be operable to control the modules described in reference to FIG. 2. In addition, one or more of the modules described in reference to FIG. 3 may be combined with one or more of the modules described in reference to FIG. 2. For example, the communication module 312 may include the provider module 202 and user module 204. And the rendering module 322 may include the integration module 218. In this way, a receiving device 102 may be capable of integrating media streams from one or more user capture devices 110 into a broadcast stream from a broadcast provider 108.

Figure 4:
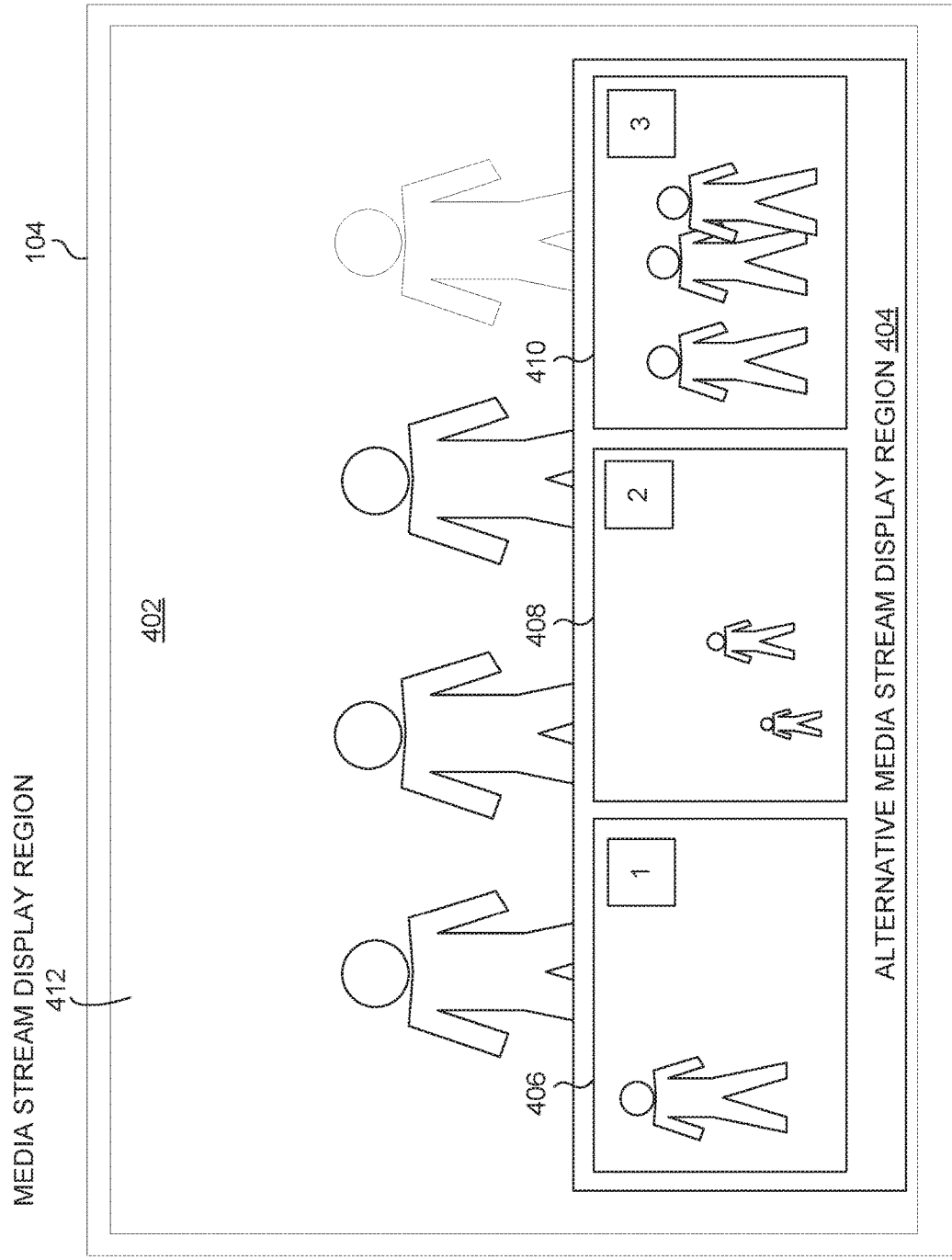
FIG. 4 illustrates an example of a presentation device displaying an audio/video rendering of an integrated media stream, in accordance with various aspects of the present disclosure.

FIG. 4 illustrates an example of a presentation device 104 displaying an audio/video rendering 402 of an integrated media stream, in accordance with various aspects of the present disclosure. The audio/video rendering 402 includes a media stream display region 412 that displays a media stream, e.g., broadcast stream from a broadcast provider, and an alternative stream display region 404 that displays one or more alternative media streams 406-410, which are an alternative view or supplemental content related to the media stream being displayed in the media stream display region 412. The alternative media streams may be user-generated media streams from user capture devices 110, or a broadcast media stream from a broadcast provider 108. In some embodiments, the alternative media streams may be displayed in pop-up windows 406-410. Each of the pop-up windows 406-410 may include an alternative view or supplemental content related to a broadcast stream from a media provider. For example, each pop-up window 404 may correspond to a media stream from user capture devices 110 at the same location as the broadcast stream being displayed in the media stream display region 412. Continuing with the above example, a first pop-up window 406 can display a first alternative media stream captured from a first of the user capture devices 110 associated with a first user and that is at the same location as the broadcast stream. A second pop-up window 408 can display a second alternative media stream captured from a second of the user capture devices 110 associated with a second user that is at the same location as the broadcast stream, and a third pop-up window 410 can display a third alternative media stream from a third of the user capture devices 110 that is at the same location as the broadcast stream and associated with a third user, the first or the second user. In another example, the broadcast stream may be of a sporting event, and each of the pop-up windows 406-410 may be of media streams from users attending the sporting event. In this way, a user viewing the presentation device 104 may view alternative views of the sporting event other what is provided by the broadcast provider.

As another example, the broadcast stream may be of a television program, and each of the pop-up windows 406-410 may correspond to media streams that have tagged a keyword related to the television program. Continuing with the above example, a first pop-up window 406 can display a first alternative television program that is associated with a first character in the television program in the broadcast stream, a second pop-up window 408 can display a second alternative television program that is associated with the first character, and a third pop-up window 410 can display a third alternative television program that is associated with a second character of the television program.

In yet another example, the broadcast stream may be displayed in the presentation device 104 and an alternative media stream can be displayed in another presentation device associated with the viewer. For example, while a television program is displayed on a television of the viewer, an alternative media stream having a program associated with one of the characters of the television program can be displayed in a tablet PC associated with viewer. The viewer may be presented with an option on the presentation device 104 asking whether the viewer would like to stream the alternative media stream on another presentation device. If the viewer chooses to stream the alternative media stream to the other presentation device, the stream integrator 112 streams the alternative media stream to the other presentation device. The viewer may authenticate the other device using any of various methods, e.g., by logging into his/her user account. In some embodiments, the viewer may also provide a list of preferred devices he/she may wish to stream the media on in user preferences.

The alternative media streams may be determined based on the content in the a broadcast stream, location of the broadcast stream, broadcaster of the broadcast stream, a person or an organization such as a producer, director, actor in the content of the broadcast stream, viewer preferences for types of alternative media streams, votes associated with the media streams (e.g., as described in association with FIGS. 1 and 2). In this way, a viewer viewing the presentation device 104 may view other user-generated content that is related to the television program.

The stream integrator 112 may determine which media streams to display in the pop-up windows 406-410 based on a variety of parameters. The parameters may include the viewer's preferences, the location of the media streams, the content of the media streams, keywords that the media streams are tagged with, and/or the number of votes a media stream has received. For example, the stream integrator 112 may randomly select a subset of the multiple media streams being broadcasted from various user capture devices 110 at the same location as the main broadcast stream, e.g., broadcast stream from a broadcast provider, and display the subset as alternative media streams in the alternative media stream display region 404. In another example, the viewer may set a threshold for a number of votes, and the stream integrator 112 may display those media streams which have received a number of votes exceeding the threshold.

In another example, the stream integrator 112 may recommend a particular alternative media stream to a viewer, e.g., by highlighting the pop-window displaying the recommended media stream. The stream integrator 112 can recommend the particular stream based on a variety of parameters, e.g., based on the viewer's past selections of the media streams of a particular content type, broadcast location, broadcast provider, broadcasting user, broadcasting user device type, broadcasting quality, etc. In some embodiments, one of the alternative media streams may be a paid event, for which the viewer may be required to pay. The stream integrator 112 may let the viewer watch a preview or an initial feed of the paid media stream for a certain duration, e.g., a few seconds or minutes, and then require the viewer to pay if the viewer wishes to continue watching the media stream.

Alternatively or in addition to the pop-up windows 406-410, the stream integrator 112 may integrate a list of available and/or popular user media streams into the integrated media stream. The list may be displayed as a sidebar along an edge of the audio/video rendering 402.

A user viewing the audio/video rendering 402 may select from the displayed pop-up windows 406-410 or list of available and/or popular user media streams to switch media streams that are being displayed. For example, the user may select user media stream 2, as shown in FIG. 4. Once selected, media stream 2 may become the primary media stream shown in the background of the audio/video rendering 402. The pop-up window 408 where user media stream 2 was displayed may then display a different user media stream, or may display the media stream that was previously in the background of the audio/video rendering 402. The user may also select from a list of available and/or popular user media streams (not shown). The selected user media stream(s) may then be displayed in the pop-up windows 406-410, or in the background of the audio/video rendering 402.

Note that the alternative media stream display region 404 can display an alternative media stream in various formats, e.g., inline video, overlaid video, in windows arranged in a matrix format, as picture-in-picture. In some embodiments, the alternative media streams are displayed as a series of tiles in a sidebar. In some embodiments, when the alternative media stream display region 404 is displayed, the media stream display region 412 may be resized to a smaller area so that the alternative media stream display region 404 does not overlap with the media stream being broadcasted in the media stream display region 412.

Figure 5:
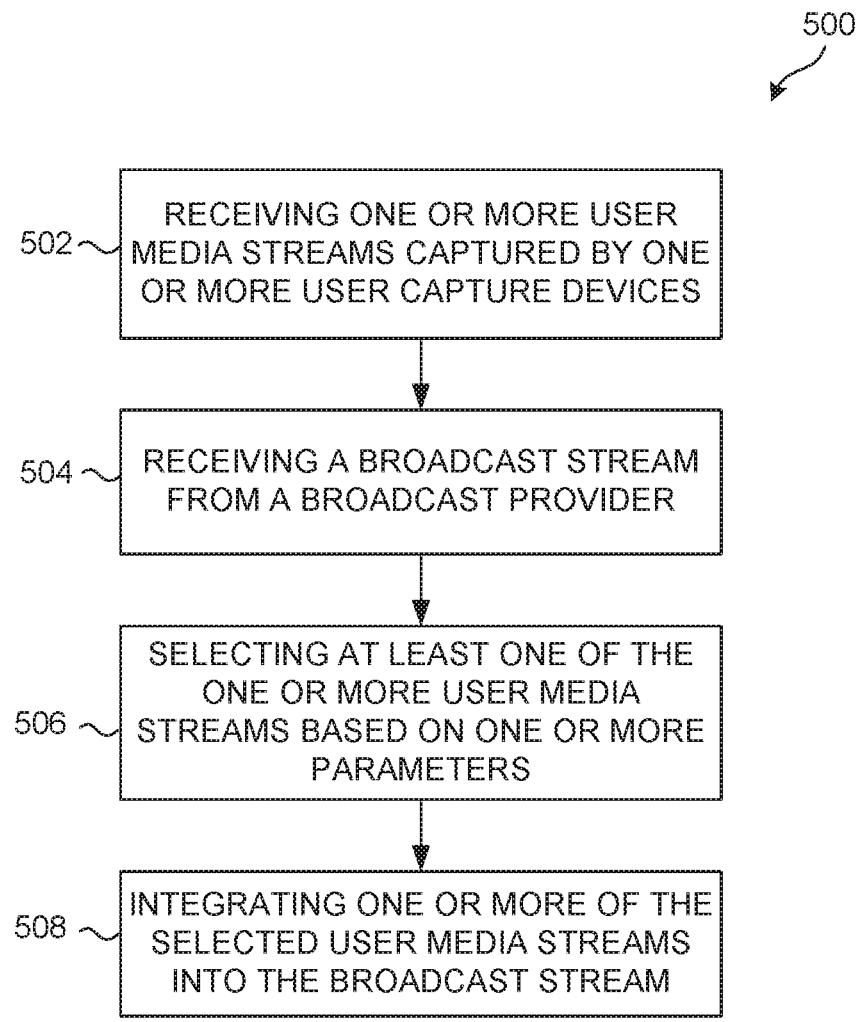
FIG. 5 is a flow diagram showing an example of a method for integrating broadcast and user media streams, in accordance with various aspects of the present disclosure.

FIG. 5 is a flow diagram showing an example of a method 500 for integrating broadcast and user media streams. The method 500 may be performed by a stream integrator 112, as described in reference to FIGS. 1 and 2.

At 502, the stream integrator 112 receives one or more user media streams captured by one or more user capture devices. In some embodiments, the stream integrator 112 may be integrated with at least one of a television, a cable television receiver, a satellite television receiver, and an over-the-air television receiver.

At 504, the stream integrator 112 receives a broadcast stream from a broadcast provider. The user media streams and the broadcast stream preferably include content associated with a same event.

At 506, the stream integrator 112 selects at least one of the one or more user media streams based on one or more parameters. The parameters may include at least one user selection of at least one user media stream from one or more user interface devices. In some embodiments, the stream integrator 112 may receive multiple user selections of user media streams from multiple user interface devices. The stream integrator then sums the number of user selections received for each of the user media streams and selects one or more user media streams based on the number of times each user media stream was selected.

The parameters may also include a location of the one or more user media streams, the content of the one or more user media streams, keywords associated with the or more user media streams, a number of votes each of the one or more user media stream has received, or a combination thereof. In some embodiments, the stream integrator 112 compares the one or more user parameters with one or more broadcast parameters associated with the broadcast stream, and then selects at least one user media stream based on the comparison.

At 508, the stream integrator 112 integrates one or more of the selected user media streams into the broadcast stream. Integrating the one or more selected user media streams into the broadcast stream may include generating one or more pop-up windows of the one or more selected user media streams overlaying the broadcast stream. Alternatively or in addition, integrating the one or more selected user media streams into the broadcast stream may include generating a list of the one or more selected user media streams. Alternatively or in addition, integrating the one or more selected user media streams into the broadcast stream may include replacing the broadcast stream with the one or more selected user media streams.

The method 500 may include additional acts, omit some acts, and/or may perform the acts in a different order than set out in the FIG. 5.

Figure 6:
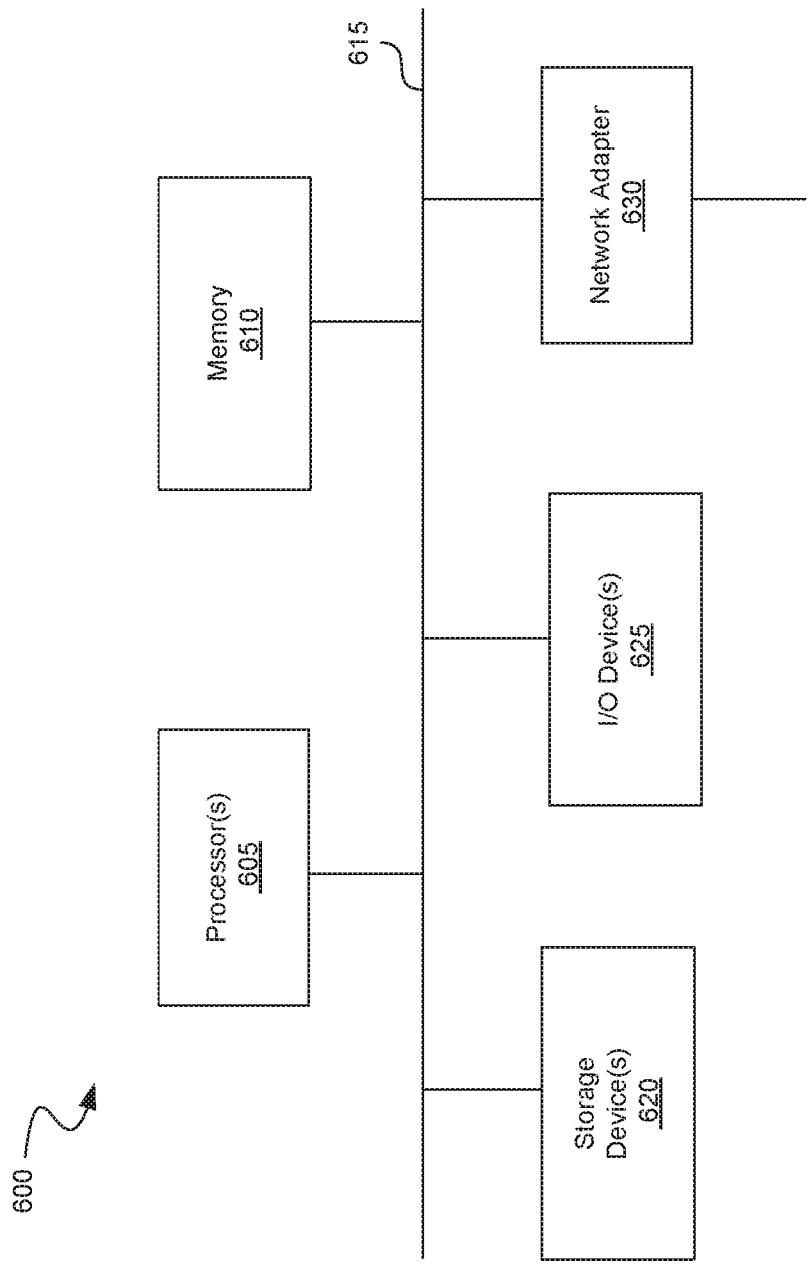
FIG. 6 is a block diagram of a processing system that can implement operations, consistent with various embodiments.

FIG. 6 is a block diagram of a computer system as may be used to implement features of the disclosed embodiments. The computing system 600 may be used to implement any of the entities, components, modules, systems, or services depicted in the examples of the foregoing figures (and any other entities described in this specification). The computing system 600 may include one or more central processing units ("processors") 605, memory 610, input/output devices 625 (e.g., keyboard and pointing devices, display devices), storage devices 620 (e.g., disk drives), and network adapters 630 (e.g., network interfaces) that are connected to an interconnect 615. The interconnect 615 is illustrated as an abstraction that represents any one or more separate physical buses, point to point connections, or both connected by appropriate bridges, adapters, or controllers. The interconnect 615, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 610 and storage devices 620 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media).

The instructions stored in memory 610 can be implemented as software and/or firmware to program the processor(s) 605 to carry out actions described above. In some embodiments, such software or firmware may be initially provided to the processing system 600 by downloading it from a remote system through the computing system 600 (e.g., via network adapter 630).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

When logic is implemented as software and stored in memory, logic or information can be stored on any non-transitory computer-readable medium for use by or in connection with any processor-related system or method. In the context of this disclosure, a memory is a non-transitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system (e.g., the control logic 412), apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. Aspects of the embodiments can be modified, if necessary, to employ systems, circuits and concepts of the various patents, applications and publications to provide yet further embodiments.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method, comprising:
    receiving, at a stream integrator, multiple user media streams captured by one or more user capture devices;
    receiving, at the stream integrator, a broadcast stream from a broadcast provider;
    selecting, by the stream integrator, a subset of the user media streams based at least in part on one or more user parameters, wherein the selecting includes:
        comparing one or more keywords of the user media streams with one or more parameters of the broadcast stream, and
        determining user media streams from those of the user capture devices that are at or near a location and that are relevant to the broadcast stream as selected user media streams;
    integrating the selected user media streams into the broadcast stream, wherein the integrating includes:
        generating the broadcast stream at a first portion of a presentation device, and
        generating a plurality of pop-up windows overlaying the broadcast stream, the plurality of pop-up windows including a first pop-up window displaying a first user media stream of the selected user media streams and a second pop-up window displaying a second user media stream; and
    recommending, by the stream integrator and based on one or more recommendation parameters, a particular user media stream of the selected user media streams to a viewer associated with the presentation device by highlighting a pop-up window of the plurality of pop-up windows in which the particular user media stream is generated.

2. The method of claim 1, further comprising:
    receiving, at the stream integrator, at least one user selection of at least one user media stream from one or more user interface devices.

3. The method of claim 1, further comprising:
    receiving, at the stream integrator, a plurality of user selections of user media streams from a plurality of user interface devices;
    summing, by the stream integrator, the number of user selections received for each of the user media streams; and
    selecting, by the stream integrator, the subset of the user media streams based on the number of user selections received for each of the user media streams.

4. The method of claim 1, wherein the user media streams and the broadcast stream include content associated with a same event.

5. The method of claim 1, wherein the one or more user parameters comprise location of the user media streams, content of the user media streams, keywords associated with the user media streams, a number of votes each of the user media streams has received, or a combination thereof.

6. The method of claim 1, further comprising:
    comparing, by the stream integrator, the one or more user parameters with one or more broadcast parameters associated with the broadcast stream; and
    selecting, by the stream integrator, one or more of the user media streams based on the comparison.

7. The method of claim 1, wherein integrating the selected user media streams into the broadcast stream comprises:
    generating a list of the selected user media streams.

8. The method of claim 1, wherein integrating the selected user media streams into the broadcast stream comprises:
    replacing the broadcast stream with the selected user media streams.

9. The method of claim 1, wherein the stream integrator is integrated with at least one of a television, a cable television receiver, a satellite television receiver, and an over-the-air television receiver.

10. A stream integration device, comprising:
    a processor; and
    a memory storing instructions, which when executed by the processor causes the processor to:
        receive multiple user media streams captured by one or more user capture devices;
        receive a broadcast stream from a broadcast provider;
        select a subset of the user media streams based at least in part on one or more user parameters, wherein the processor is configured to:
            compare one or more keywords of the user media streams with one or more parameters of the broadcast stream, and
            determine user media streams from those of the user capture devices that are at or near a location and that are relevant to the broadcast stream as selected user media streams; and
        integrate the selected user media streams into the broadcast stream, wherein the processor is further configured to:
            generate the broadcast stream at a first portion of a presentation device,
            generate a plurality of pop-up windows overlaying the broadcast stream, the plurality of pop-up windows including a first pop-up window displaying a first user media stream of the selected user media streams and a second pop-up window displaying a second user media stream of the selected media streams; and recommend, based on one or more recommendation parameters, a particular user media stream of the selected user media streams by highlighting a pop-up window of the plurality of pop-up windows in which the particular user media stream is generated.

11. The stream integration device of claim 10, wherein the processor is configured to receive at least one user selection of at least one user media stream from one or more user interface devices.

12. The stream integration device of claim 10, wherein the processor is configured to:
receive a plurality of user selections of user media streams from a plurality of user interface devices; and
calculate the number of user selections received for each of the user media streams,
wherein the preferences module selects the subset of the user media streams based on the number of user selections received for each of the user media streams.

13. The stream integration device of claim 10, wherein the user media streams and the broadcast stream include content associated with a same event.

14. The stream integration device of claim 10, wherein the one or more user parameters comprise location of the user media streams, content of the user media streams, keywords associated with the user media streams, a number of votes each of the user media streams has received, or a combination thereof.

15. The stream integration device of claim 10, wherein the processor is configured to compare the one or more user parameters with one or more broadcast parameters associated with the broadcast stream, and selects the subset of the user media streams based on the comparison.

16. The stream integration device of claim 10, wherein the processor is configured to generate a list of the selected user media streams.

17. The stream integration device of claim 10, wherein the wherein the processor is configured to replace the broadcast stream with the selected user media streams.

18. A non-transitory computer-readable storage medium comprising a set of instructions that, when executed by one or more processors, cause a machine to:
receive multiple user media streams captured by one or more user capture devices;
receive a broadcast stream from a broadcast provider;
select a subset of the user media streams based at least in part on one or more parameters by:
comparing one or more keywords of the user media streams with one or more parameters of the broadcast stream, and
determining user media streams from those of the user capture devices that are at or near a location and that are relevant to the broadcast stream as selected user media streams; and
integrate the selected user media streams into the broadcast stream by:
generating the broadcast stream at a first portion of a presentation device,
generating a plurality of pop-up windows overlaying the broadcast stream, the plurality of pop-up windows including a first pop-up window displaying a first user media stream of the selected user media streams and a second pop-up window displaying a second user media stream of the selected media streams;
recommending, based on one or more recommendation parameters, a particular user media stream of the selected user media streams by highlighting a pop-up window of the plurality of pop-up windows in which the particular user media stream is generated.

* * * * *